(No Model.) 2 Sheets—Sheet 1.

C. L. COOMBS.
SYSTEM OF CONTROLLERS FOR ELECTRIC MOTOR CARS.

No. 539,726. Patented May 21, 1895.

WITNESSES:
T. W. Johnson,
James G. Jester

INVENTOR:
Charles L. Coombs.

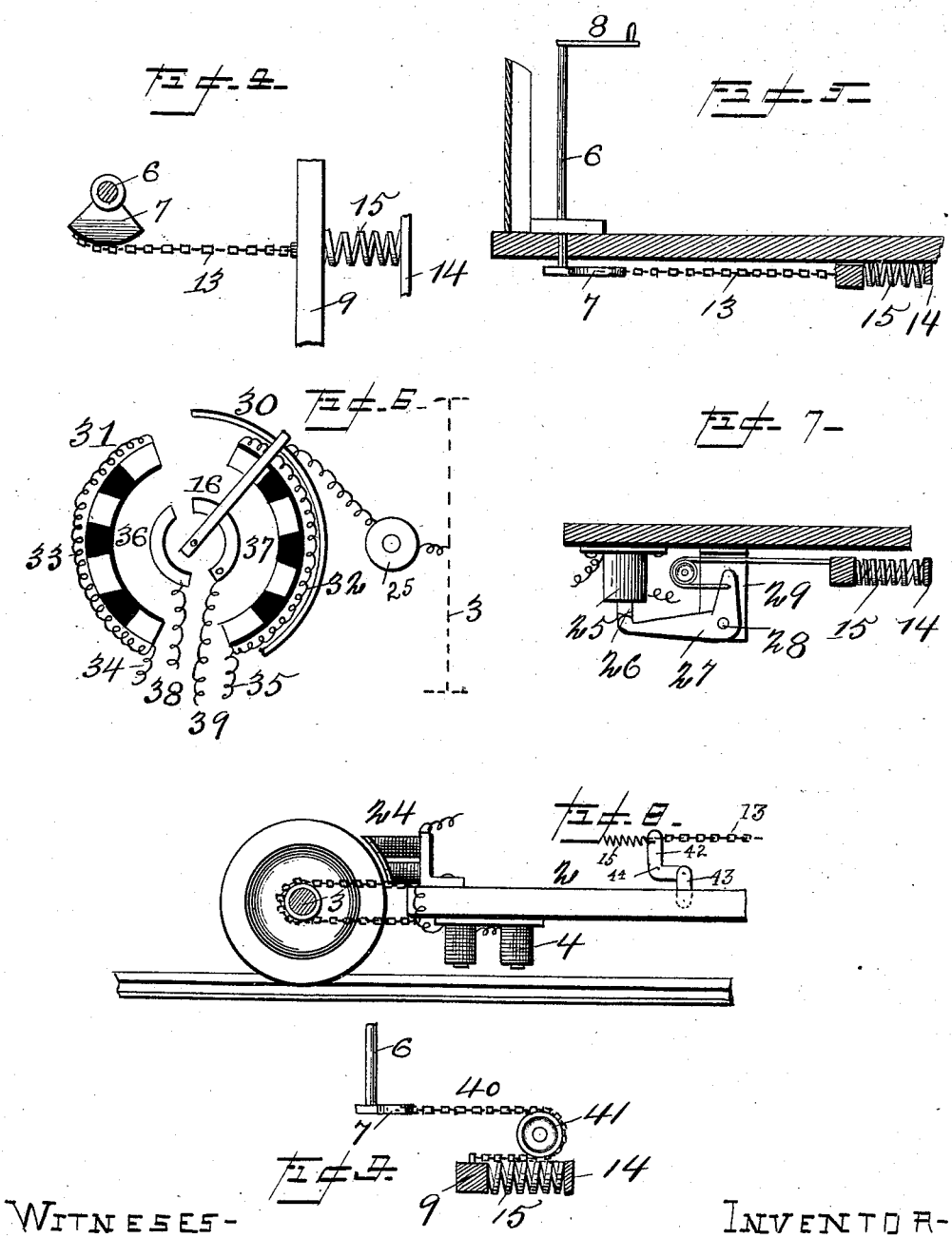

United States Patent Office.

CHARLES L. COOMBS, OF WASHINGTON, DISTRICT OF COLUMBIA, ASSIGNOR TO THEODORE D. DALE, OF MARIETTA, OHIO.

SYSTEM OF CONTROLLERS FOR ELECTRIC-MOTOR CARS.

SPECIFICATION forming part of Letters Patent No. 539,726, dated May 21, 1895.

Application filed November 12, 1894. Serial No. 528,536. (No model.)

*To all whom it may concern:*

Be it known that I, CHARLES L. COOMBS, a citizen of the United States, residing at Washington, in the District of Columbia, have invented certain new and useful Improvements in Systems of Controllers for Electric-Motor Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a new and improved system of controllers for electric motor cars, wherein the switch which controls the current passing to the motor is used at the same time to control the current passing to other portions of the car, such, for instance, as the braking mechanism, in which case the movement of the switch is made to mechanically elevate the magnets from the rail or other mass of magnetic material, either by direct attachment to it, so as to mechanically move it, or by a double current attachment, to be hereinafter more fully explained.

The object of the invention is to equip a car, or train of cars, with a brake-mechanism which may be operated electrically and instantaneously to retard the motion of and eventually stop the car or train, as will be more fully hereinafter explained and specifically pointed out in the claims. This object is attained by the means illustrated in the accompanying drawings, in which—

Figure 1:
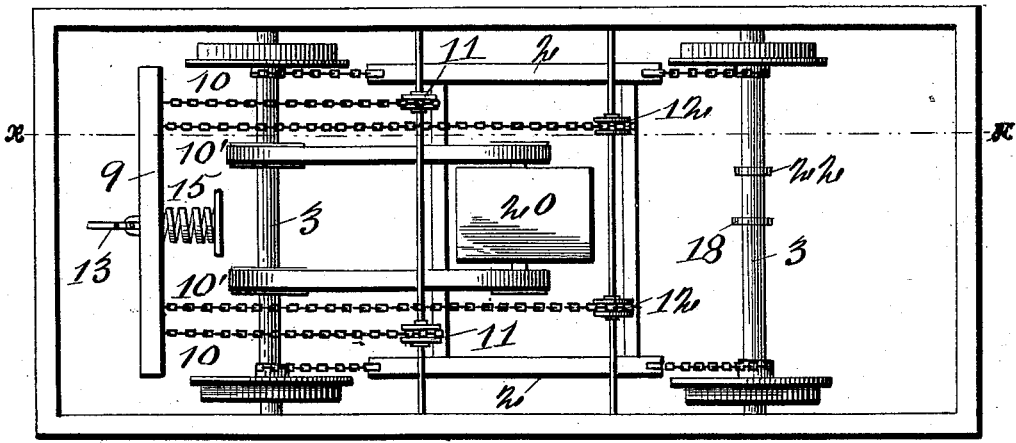
Figure 2:
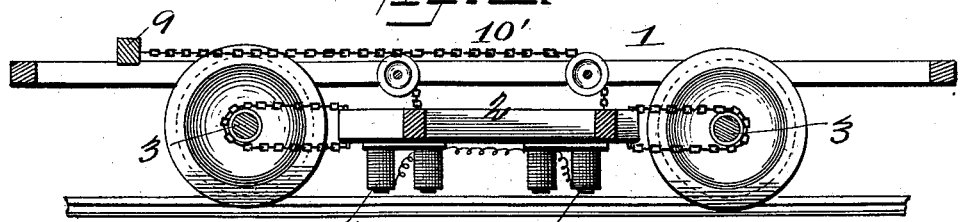
Figure 3:
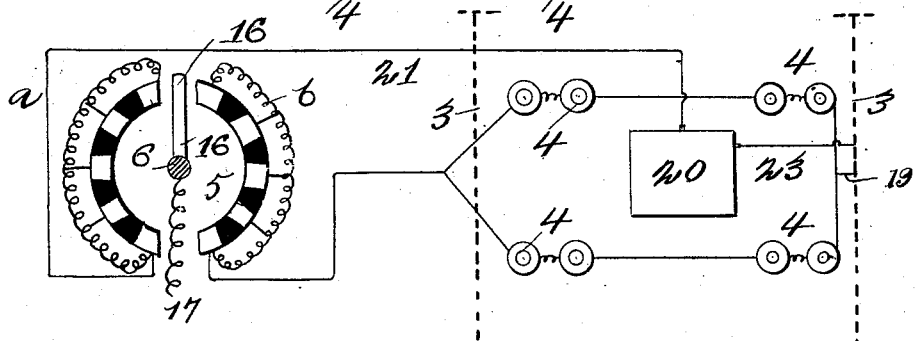

Figure 1 represents a plan view of a car-truck, showing my invention applied thereto; Fig. 2, a vertical longitudinal section on line *x x* of Fig. 1; Fig. 3, a diagrammatic view showing the electrical connections of the brake mechanism; Fig. 4, a detached plan view of a portion of the brake-operating mechanism; Fig. 5, a detail sectional view of the brake-operating mechanism; Fig. 6, a diagrammatic view of a modified form of switch mechanism; Fig. 7, a sectional view of a portion of a modified form of brake-operating mechanism; Fig. 8, a detail view of a modified form of brake mechanism and mechanical moving device, and Fig. 9 another detail modification of brake-operating mechanisms.

Referring to the drawings, the numeral 1 indicates the frame of the car-truck which is of the usual construction.

The numeral 2 indicates a rectangular frame, which is suspended at opposite ends from the axles 3 of the truck, as shown. The side bars of this frame have suspended from them, and securely attached thereto, the horse-shoe electro-magnets 4, the coils of which are connected in series with each other and with one segment of a rheostat 5, located at a convenient position on the car.

The numeral 6 indicates an upright rod, journaled in suitable bearings in the platform of the car, and carrying at its lower end a sector 7, for the purpose hereinafter described. The rod at its upper end is provided with a hand-operating lever, 8, by which it may be turned.

Suitably suspended in the truck-frame, is an equalizing-bar, 9, from which extend rearwardly chains 10 and 10', that pass respectively over pulleys 11 and 12 and are connected respectively, by eye-bolts or otherwise, as by bell crank lever, see Fig. 8, to the cross-bars of the frame 2, before mentioned. The equalizing-bar is connected, at its front, to the periphery of the sector 7 by means of a chain 13, so that when the lever is turned in the proper direction the said frame will be elevated and when turned in the opposite direction will be dropped, or forced downward or against the magnetic substance, as will be hereinafter more fully explained.

Situated suitably, as for instance, between the equalizing-bar and a cross-bar, 14, of the truck-frame is a spiral or other spring 15, which exerts a pressure against the equalizing-bar sufficient to nearly counterbalance the weight of the brake-frame and magnets, so as to permit the said frame to be readily raised by the brake-lever.

The rod 6 is provided with an insulated contact-arm 16, which is connected, in any suitable manner, with a conductor 17, leading to a trolley, or to a storage battery or other source of electrical energy. The said arm is arranged to pass successively into contact with the contact plates of the rheostat, so as to direct the current in proper quantity to the motor or the brake magnets, or cut off altogether as hereinafter explained. The rheostat is provided with two independent resistance segments $a, b$, one of which is electrically connected with the motor and the other with the brake-magnets. The conductors, connecting the coils of the rear electro-magnets, are connected to a collar, 18, on one axle of the car-truck, by means of a conductor, 19, which grounds the current through the wheels.

A numeral 20 indicates the motor, which is located, as usual, within the truck-frame, and which imparts motion to the axles. The armature coils of the motor are connected with the segment $a$ of the rheostat, by means of the usual brushes and a conductor 21, and with a loose collar 22, on one of the axles by means of a conductor, 23, which grounds the current through the motor.

The operation of the above described mechanism is as follows: The brake-magnet frame sets, normally as shown in Fig. 2, that is to say, with the poles of the magnet out of contact with the rails, and when the brake-lever stands at normal position, between the segments $a$ and $b$, the current is cut off from the motor as well as from the brake-magnets. When the lever is manipulated to turn the contact arm 16 to the left to bring said arm in contact with one of the contact plates of the segment $a$ of the rheostat, the current will be sent through the motor and the car started. When the operating-lever is turned in the opposite direction so as to bring the contact-arm into contact with one of the contact-plates of the segment $b$, the current is switched from the motor to the brake-magnets, energizing the same, and causing them to be attracted by and preferably adhere to the rails, which act as armatures to said magnets. The movement of the switch lever also partially rotates the segment 7, at the lower end of the rod 6, permitting or forcing the brake-magnet frame to drop, so as to allow the poles of the magnets to approach the rails, preferably before they are energized. The movement of the frame, brings the poles into contact with the rails. In cutting out the brake-magnet and switching in the motor, by turning the contact arm to the left, it is evident that the magnet-frame will be elevated, so as to raise the poles of the magnet from their contact or near proximity to the rails. The mutual attraction of the brake-magnets and rails, serves to retard the motion of the cars, and to completely brake the motion. Additional magnets 24 may also be secured to the ends of the brake-frame. The coils of these magnets are electrically connected with the coils of the brake-magnets, and their poles are curved at the ends to correspond to the curve of the peripheries of the wheels, so that when the magnet-frame is dropped the poles will contact with the said peripheries of the wheels which serve as armatures and effectually lock the wheels. It will be perceived that by this construction the retardation and final stoppage of the car or train will be gradual, as the pendent magnets are attracted toward the rail, before the wheel magnets come in contact with the wheels to stop the car or train. It is obvious that the same effect may be attained by gradually increasing the current through the brake-magnets after contacting, or to bring them eventually into contact with the rails.

It is evident that all the magnets may be used together, or that either set may be used singly.

The modification represented in Figs. 6 and 7 of the drawings shows mechanism, by means of which the brake-mechanism may be operated by a current independent of that which operates the motor. In the said figures the numeral 25 indicates an electro-magnet or hollow coil or solenoid, having a movable core or armature 26, which is loosely connected to one arm of an angle-lever 27. The said lever is fulcrumed at 28 to a hanger, 29, dependent from the floor of the car. One terminal of the coil or solenoid, connects with the segment 30. The other terminal connects with the axle, so as to ground the current through the wheels, or in any other manner to form a return circuit to the source of electrical supply. The rheostat is provided with two resistance segments 32 and 33, having the usual contact plates and intervening resistance coils. One of these segments connects with the brake-magnets, by means of a conductor 34, and the other with the motor of the car, by means of a conductor 35. The rheostat is provided with additional segments 36 and 37, one of which connects with the trolley, for the motor, by means of a conductor 39 and the other with a storage battery, or other source of electrical energy, as hereinafter explained, for the brakes by means of a conductor 38. Upon manipulating the brake-lever to turn the contact-arm to the right, the current from the trolley is sent through the motor, and through the coil or solenoid 25, operating the angle-lever 27 in such manner as to pull the equalizing-bar forward and elevate the frame carrying the brake-magnets. When the contact-arm is turned to the left, the solenoid or coil is cut out of circuit, the brake magnet-frame released, and the motor thrown out of circuit and the brake-magnets into circuit.

In the modification shown in Fig. 9, the numeral 40 indicates a chain passing backward from the equalizing-bar, and, extending over a pulley, 41, has its outer end secured to the sector 7, above mentioned, so that when the brake-lever is manipulated to turn the contact-arm to the right, the frame will be drawn backward and dropped.

In the modification shown in Fig. 8, which is one of the preferred forms, the frame 2, with its magnets 4 is shown supported by the bell-crank lever 42 and link 43 pivoted at 44, by the pull of the spring 15', and instead of being dropped to the rail it is forced down by the direct action or pull of chain 13 which may pass to sector 7 as in the other figures, or it may be manipulated in any suitable manner. By this means the magnets may be used mechanically to retard the car by being held solidly against the track independent of any magnetization and even after the current has ceased to flow through the coils.

It will be perceived that the connection of the brake-magnet-frame is such as to readily allow of the movement of said frame. The brake-magnets may be operated on the wheel, in a manner similar to the ordinary brake-shoe, or may be worked on the face of the wheel. The electrical energy may be derived from a different source from that serving the motor, as shown in Fig. 6 of the drawings, as for instance storage batteries, primary batteries; or the current may be taken from the motor, which may be run as a generator, when idle as a motor, or from a separate source with a separate trolley, or any other well known means may be employed. When a separate source of current is used for the magnet the extra segments 36 and 37 are employed, the switch establishing a proper current connection. It will be further perceived, that the frame supporting the magnets may be of any form instead of being rectangular as described. The magnets themselves may form their own frame. Any form of frame may be used other than the horseshoe magnet described, and the connections between the magnets may be a multiple arc or other connection instead of a series connection as described. The balancing or other springs may be connected in any suitable position for performing their functions, and many other departures from the construction shown herein may be made without departing from the spirit of the invention. As is furthermore well understood the current controlling devices may be used other than the rheostat or rheostats described, and the invention extends to such use.

Having thus fully described my invention, what I claim, and desire to secure by Letters Patent, is—

1. The combination, with a car or car-truck, of a frame suspended therein, brake-magnets secured to or forming such frame with their poles arranged to set over a rail of the track, an electro-magnet secured to the frame opposite the periphery of a car wheel, circuit connections with a rheostat or other current controlling device, and a lever for operating the device whereby a current of electricity may be sent through the magnets.

2. The combination, with a car or car-truck, of a manually actuated handle, an electro magnet or magnets movably mounted on said truck, a magnetic substance located adjacent to such magnet or magnets, a moving connection for establishing an electric circuit through the magnets, means for mechanically moving the magnets to and from the surface of such substance and a connection between the said means, the said connection and the handle.

3. The combination, with a car or car truck, of a manually actuated handle, an electro magnet or magnets movably mounted on said truck, a magnetic substance located adjacent to such magnet or magnets, connections for varying the flow of electric current through the magnets, means for mechanically moving the magnets to and from said such surface and operating connections between the said means, said electrical connections and the handle.

4. The combination, with a car or car-truck, of an electro-magnet or magnets movably mounted therein, a magnetic substance adjacent to such magnets, connections for establishing electric circuits through the magnets, a switch in such connection, a device for mechanically moving the magnets to and from the surface of such substance, and connection between the switch and the device.

5. The combination, with a car or car-truck, of an electro-magnet or magnets movably mounted therein, a magnetic substance adjacent to such magnets, an electric motor for driving said car-truck, connections for establishing an electric circuit through the magnets, independent connections for establishing an electric circuit through the motor, a switch for the connections, a device for mechanically moving the magnets to and from the surface of said substance, and a manipulator common to both switch and device.

6. The combination, with the car or car-truck, of an electro-magnet or magnets movably mounted therein, a magnetic substance adjacent to such magnets, an electric motor for driving said car-truck, connections for establishing an electric circuit through the motor, a switch for such connections, a device for mechanically moving the magnet to and from the surface of said substance, and a common manipulator for the switch and device of such a character that the magnets are moved toward said surface when the said switch is being open-circuited.

7. The combination, with a car or car-truck, of an electro-magnet or magnets movably mounted therein, a magnetic substance adjacent to such magnets, an electric motor for driving said car-truck, connections for establishing an electric circuit through the magnets, a switch for such connections, a device for mechanically moving the magnets to and from the surface of said substance, and a common manipulator for the switch and device of such a character that the magnets are moved toward said surface when by means of said switch, the magnet connection is being closed.

8. The combination, with a car or car-truck, of a frame mounted therein and carrying a series of magnets arranged to hang over the rails, of a solenoid, having a co-operating moving part and a lever connected with the said part and with the frame, and a rheostat electrically connected with the solenoid, and a contact arm, whereby the solenoid may be energized and de-energized, to raise and lower the frame, and retard the motion of the car or train, substantially as specified.

9. The combination, with the car or car-truck, of a frame mounted on said truck and carrying a series of dependent magnets arranged to hang over the rails, a solenoid having a moving part, a source of electrical supply therefor, a lever connected to said part and to the frame, a rhoestat having segments connected, respectively, with the magnets, the motor and independent sources of electric energy, and a contact lever, whereby the current from one source may be sent through the motor, and the current from the other source through the magnets, substantially as specified.

10. In a car or car truck, a manually actuated handle, a frame suspended on said truck and carrying a series of electro-magnets suitably arranged over a portion of the road bed, a spring situated between a portion of the car or truck and the magnet or magnets, mechanism for raising and lowering the magnets, means for energizing said magnets, in combination with a connection between the said handle, the mechanism and the means, substantially for the purpose specified.

11. In a car or car-truck an electro magnet or magnets movably suspended therein, a magnetic substance adjacent to such magnets, an electric motor for driving the car-truck, connections for establishing an electric circuit through the magnets, independent connections for establishing an electric circuit through the motor, a source of current supply for the motor, a device for mechanically moving the magnets to and from the surface of such substance, a manipulator for the device, in combination with the switch for said electrical connections of such character that when the magnet connection is closed the connection from the said motor to the said source of supply is interrupted, and an operating connection from the manipulator to the switch.

In testimony whereof I affix my signature in presence of two witnesses.

CHARLES L. COOMBS.

Witnesses:
 DAVID E. MOORE,
 T. W. JOHNSON.